(12) United States Patent
Muramatsu et al.

(10) Patent No.: US 12,401,256 B2
(45) Date of Patent: Aug. 26, 2025

(54) REPAIR METHOD OF STATOR IRON CORE

(71) Applicant: MITSUBISHI GENERATOR CO., LTD., Kobe (JP)

(72) Inventors: Seijiro Muramatsu, Tokyo (JP); Hiroki Aso, Tokyo (JP); Kota Hosaka, Tokyo (JP)

(73) Assignee: Mitsubishi Generator Co., Ltd., Kobe (JP)

( * ) Notice: Subject to any disclaimer, the term of this patent is extended or adjusted under 35 U.S.C. 154(b) by 407 days.

(21) Appl. No.: 17/858,166

(22) Filed: Jul. 6, 2022

(65) Prior Publication Data
US 2023/0027901 A1  Jan. 26, 2023

(30) Foreign Application Priority Data
Jun. 1, 2021  (JP) ................... 2021-092066

(51) Int. Cl.
*H02K 15/50* (2025.01)
(52) U.S. Cl.
CPC .................... *H02K 15/50* (2025.01)
(58) Field of Classification Search
CPC ..... H02K 15/00; H02K 15/02; H02K 15/0006
See application file for complete search history.

(56) References Cited

FOREIGN PATENT DOCUMENTS

| | | | |
|---|---|---|---|
| CN | 112290756 A | * | 1/2021 |
| EP | 1 592 110 B1 | | 6/2011 |
| EP | 1 594 213 B1 | | 3/2017 |

OTHER PUBLICATIONS

CN 112290756 with English Translation (Year: 2021).*

* cited by examiner

*Primary Examiner* — Moshe Wilensky
(74) *Attorney, Agent, or Firm* — BUCHANAN, INGERSOLL & ROONEY PC (57) ABSTRACT

A repair method of a stator iron core which has a slot for accommodating a stator coil, and is formed by laminating silicon steel sheets. The method is implemented by moving a part of the silicon steel sheets which form the stator iron core while holding the stator coil in the slot to form a gap between the laminated silicon steel sheets of the stator iron core in the existence of a damaged part, and adding an insulation to the damaged part of the silicon steel sheet from the gap formed between the laminated silicon steel sheets to repair the damaged part of the silicon steel sheet.

8 Claims, 9 Drawing Sheets

REPAIR METHOD OF STATOR IRON CORE

CLAIM OF PRIORITY

The present application claims priority from Japanese Patent application serial no. 2021-92066, filed on Jun. 1, 2021, the content of which is hereby incorporated by reference into this application.

BACKGROUND OF THE INVENTION

The present invention relates to a repair method of a stator iron core.

In general, a stator for a large-sized rotary electric machine such as the turbine generator to be installed in a thermal power plant or a nuclear power plant includes a stator iron core and a stator coil (stator winding). Especially, the stator iron core is formed by laminating thin silicon steel sheets each having a thickness of 1 mm or less. The silicon steel sheet has its both surfaces insulated so that the laminated silicon steel sheets are electrically insulated from one another.

The stator coil is embedded in multiple slots (grooves) formed in the stator iron core, and fixed with a wedge. The stator coil embedded in the slot has its axial end (coil end part) electrically connected to other stator coil at its axial outer side.

After commencement of operations, the rotary electric machine is periodically inspected once every several years. Upon inspection of soundness of the stator iron core in the periodic inspection, damage (insulation abnormality) to the stator iron core may be detected as a result of abnormal operation or aged deterioration in the rotary electric machine. The stator iron core may need to be repaired depending on the damage condition.

There have been European Patents EP1594213B and EP1592110B as background art of the above-described technical field. EP1594213B discloses the use of the rail as function extension which allows horizontal insertion of the lamination layer into the stator frame (see ABSTRACT). EP1592110B discloses horizontal movement of the lamination layer in the stator frame (see ABSTRACT). In other words, according to the disclosures of EP1594213B and EP1592110B, the damaged stator iron core is repaired while holding the rotary electric machine in the laterally placed state.

SUMMARY OF THE INVENTION

EP1594213B and EP1592110B disclose that the damaged stator iron core is repaired while the rotary electric machine is held in the laterally placed state.

If the damaged part of the stator iron core (insulation abnormality) is located in a position (inner diameter side) near the surface of the stator iron core, it can be repaired using the grinder and/or the etching solution.

Meanwhile, if the damaged part is located in a deep position (outer diameter side) from the surface, it cannot be repaired by using the grinder and/or the etching solution. Repair of such damaged part requires a series of operations of removing the rotor of the rotary electric machine, bringing the stator frame into an erected state, and disassembling the stator coil and then the stator iron core so that the damaged stator iron core (silicon steel sheet) is replaced, or the insulator is added.

The replacement of the silicon steel sheet or addition of the insulator requires a large-scale construction work such as bringing the stator frame into the erected state or disassembly of the stator coil and the stator iron core, resulting in increased repair costs and prolonged repair time.

Considering the above-described problem, the present invention provides the repair method of the stator iron core at lower cost in the short repair time even in the case of repairing the damaged part located in the deep position from the stator iron core surface.

In order to solve the problems, the present invention provides a repair method of a stator iron core which has a slot for accommodating a stator coil, and is formed by laminating silicon steel sheets. The method is implemented by moving a part of the silicon steel sheets which form the stator iron core while holding the stator coil in the slot to form a gap between the laminated silicon steel sheets of the stator iron core in the existence of a damaged part, and adding an insulator to the damaged part of the silicon steel sheet from the gap formed between the laminated silicon steel sheets to repair the damaged part of the silicon steel sheet.

The present invention ensures to provide the repair method of the stator iron core at lower cost in the short repair time even in the case of repairing the damaged part located in the deep position from the stator iron core surface.

The problems, structures, and advantageous effects other than those described above will be clarified by explanations of the following examples.

DETAILED DESCRIPTION OF THE PREFERRED EMBODIMENTS

Hereinafter, an example of the present invention will be described referring to the drawings. Substantially the Same or similar structures are designated With the same reference signs, and repetitive explanations of those structures may be omitted for avoiding redundancy.

Example

An explanation will be made with respect to the structure of a rotary electric machine 100 according to the example.

Figure 1:
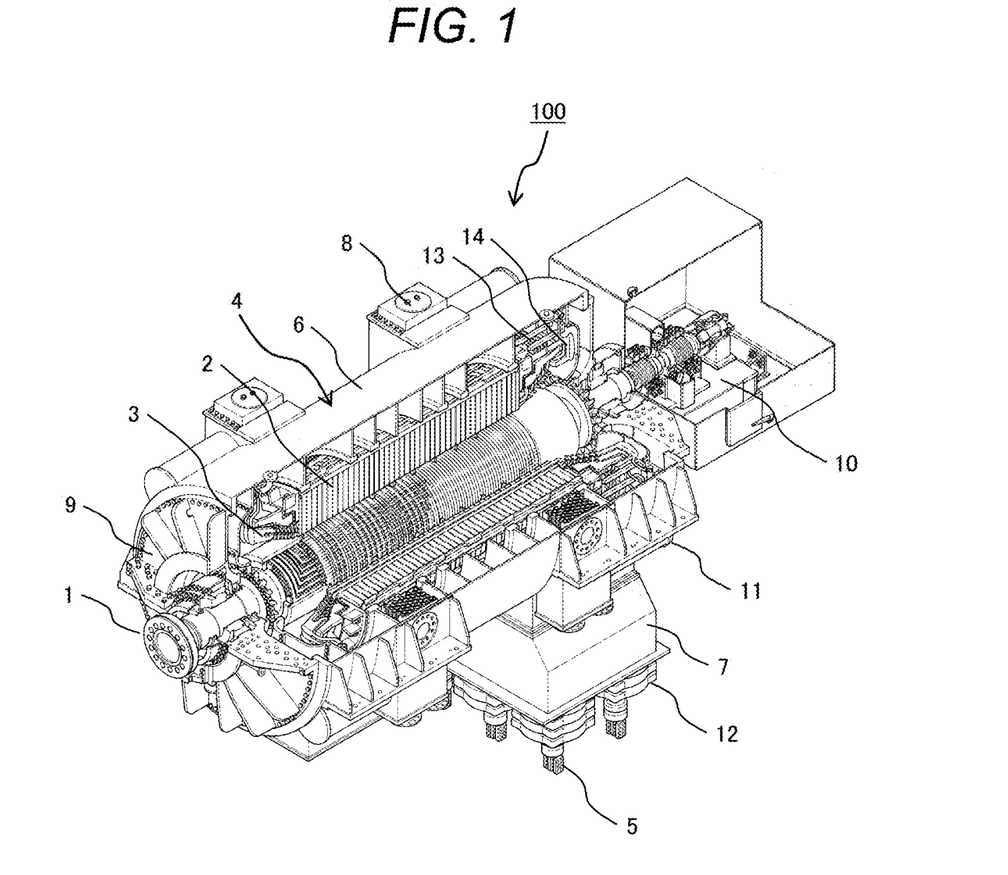
FIG. 1 illustrates a structure of a rotary electric machine 100 according to an example.

FIG. 1 illustrates a structure of the rotary electric machine 100 according to an example. FIG. 1 omits illustration of a part of the structure for convenience of explanation.

The rotary electric machine 100 is generally classified into three types, that is, water-cooled type, hydrogen-cooled type, and air-cooled type. The water-cooled rotary electric machine is configured to cool a stator coil 3 using water according to output (capacity) so that the inside of the machine is cooled with hydrogen gas. The hydrogen-cooled rotary electric machine is configured to cool the stator coil 3 and the inside of the machine using hydrogen gas. The air-cooled rotary electric machine is configured to cool the stator coil 3 and the inside of the machine using air. Each of the water cooled rotary electric machine and the hydrogen-cooled rotary electric machine serves to fill the inside of the machine with pressurized hydrogen gas.

According to the example, hydrogen gas is filled inside the rotary electric machine (turbine generator) 100 so as to be cooled.

The rotary electric machine 100 includes a rotor 1 and a stator 4, which are placed opposite to eat other at a predetermined interval. The stator 4 includes a stator iron core 2 an the stator coil 3.

The rotary electric machine 100 includes a high-voltage bushing (power supply terminal) 5 for outputting current from the stator coil 3 to the outside of the machine, power lines including a connection ring 13 and a lead wire 14 for forming the current path by connecting the stator coil 3 with the high-voltage bushing 5, and a lead wire 37 (see FIG. 12) for taking out the current generated in the machine to the outside thereof, a rotary electric machine casing 6 for storing the rotor 1, the stator 4, the connection ring 13, the lead wire 14 and the like, having its inside filled with hydrogen gas, a terminal box 7 disposed below the rotary electric machine casing 6 while connected thereto, a hydrogen cooler 8 for cooling the inside of the machine using hydrogen gas while connected to the rotary electric machine casing 6, an end bracket 9 which seals an axial end of the rotary electric machine casing 6 for storing a bearing or the like, a brush gear 10 for storing a collector ring which supplies direct current to the coil of the rotor 1, and a carbon brush, a foot 11 to which the rotary electric machine casing 6 is fixed, and a current transformer 12 for measuring the current to be output from the high-voltage bushing 5 to the outside of the machine.

The rotary electric machine 100 is connected to, for example, a steam turbine or a gas turbine to transfer rotational energy of the steam turbine or the gas turbine to the rotor 1 which is then rotated at high speeds at the inner side of the stator 4 for power generation.

The stator iron core 2 is formed by axially laminating thin silicon steel sheets each having a thickness equal to or smaller than 1 mm (0.35 to 0.50 mm), which are electrically insulated from one another. The stator 4 includes the stator iron core 2 having multiple slots formed therein, and the stator coil 3 which is embedded in the slot, and fixed by a wedge so as tb be fitted with the stator iron core 2. The stator iron core 2 having the multiple slots for accommodating the stator coil 3 is formed axially laminating the silicon steel sheets.

Figure 2:
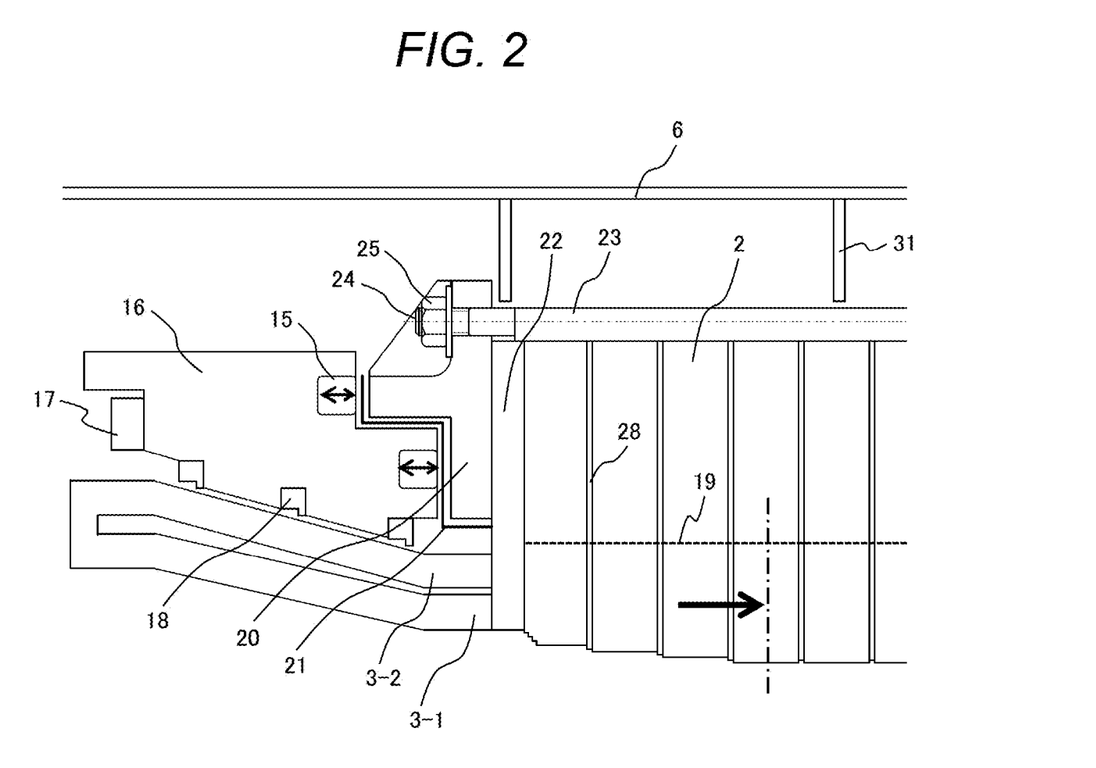
FIG. 2 is a sectional view of an axial end structure of the rotary electric machine 100 according to the example when viewed from a lateral direction.
Figure 3:
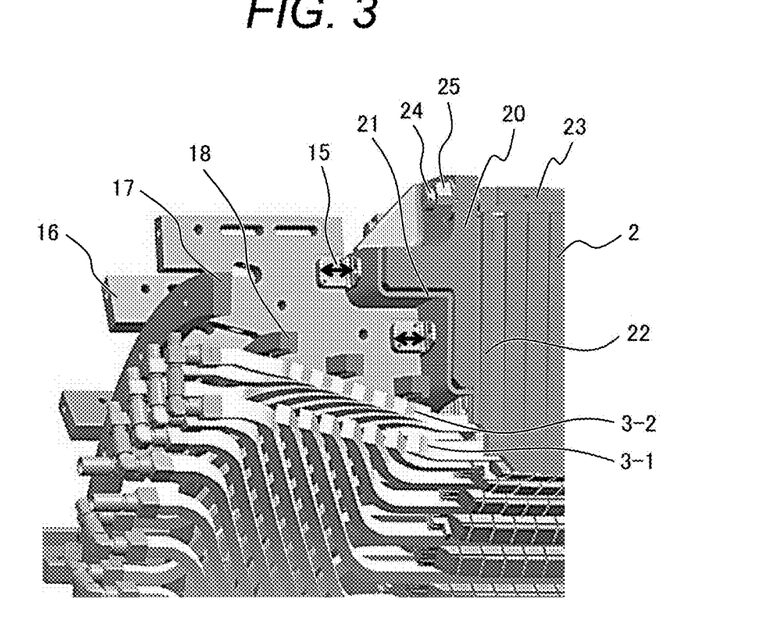
FIG. 3 is a perspective view of the axial end structure of the rotary electric machine 100 according to the example when viewed from a diagonal direction.

An explanation will be made with respect to an axial end structure of the rotary electric machine 100 according to the example referring to the view from lateral and diagonal directions.

FIG. 2 is a sectional view of the axial end structure of the rotary electric machine 100 according to the example when viewed from the lateral direction.

FIG. 3 is a perspective view of the axial end structure of the rotary electric machine 100 according to the example when viewed from the diagonal direction.

Referring to FIG. 2 and FIG. 3, core clamps 20 are provided at the axial ends of the stator iron core of the rotary electric machine 100 for clamping the thin silicon steel sheets axially (in a laminating direction) from both ends. An end duct piece 22 for transmitting the axial compression force to the stator iron core 2 is placed between the core clamp 20 and the stator iron core 2. That is, the core clamps 20 compress both ends of the stator iron core 2 from both ends via the end duct piece 22.

A key bar 23 is disposed at the outer circumferential side of the stator iron core 2 for support from the outer circumferential side. An axial end of the key bar 23 is fixed (bolt-fastened) to the core clamp 20 via a key bar bolt 24 and a key bar nut 25. In other words, the key bar 23, the key bar bolts 24, and the key bar nuts 25 compress the stator iron core 2 from the outer circumferential side and both ends via the core clamps 20.

The rotary electric machine casing 6 placed at the outer circumferential side (outer circumferential side of the stator iron core 2) of the key bar 23 includes a stator main plates 31, and has the inside filled with hydrogen gas. The stator main plates 31 support the rotary electric machine casing 6 by forming predetermined spaces therein. The multiple stator main plates 31 are placed in a ring-like arrangement inside the rotary electric machine casing 6 at predetermined intervals in an axial direction.

At the outer side of the stator iron core 2 in the axial direction, the curved stator coil 3 is fastened to a permanent ring 17 and a support ring 18, which are placed integrally with an axial support 16 fixed to the core clamp 20 through glass fiber roving. The stator coil is then fixed using epoxy varnish.

The stator coil 3 has its axial end electrically connected to the stator iron core 2 at its axial outer side.

A coil end support (coil end part) including the axial support 16, the permanent ring 17, and the support ring 18 is fixed to the core clamp 20 placed at the axial end of the stator iron core 2.

The axial end of the stator coil 3 is fixed to the core clamp 20 at the outer side of stator iron core 2 in the axial direction using the laminated glass plate, non-magnetic metal, glass fiber, epoxy varnish or the like so that the coil end support is formed.

A copper shield 21 is interposed between the axial support 16 and the core clamp 20. The axial support 16 is fixed to the core clamp 20 via the copper shield 21.

A slide bearing 15 for transmitting the axial compression force to the stator iron core 2 is placed outside the copper shield 21. The slide bearing 15 is placed on the axial support 16 to absorb the thermal expansion difference between the stator coil 3 and the stator iron core 2, which is caused by temperature rise.

Multiple intermediate ducts 23 are placed in the stator iron core 2 at predetermined intervals in an axial direction. The intermediate duct 28 in the form of an H-steel, for example, is formed between the stator iron cores 2 (silicon steel sheets) each having multiple laminated sheets to serve as a gap which allows circulation of hydrogen gas.

A predetermined interval between the stator main plates 31 is larger than the predetermined interval between the intermediate ducts 28.

Figure 4:
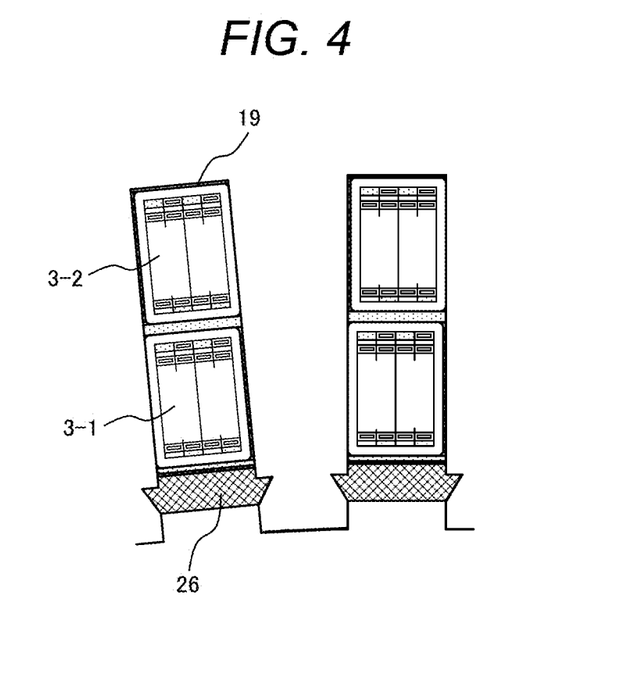
FIG. 4 is a sectional view of a slot 19 formed in a stator iron core 2, and a stator coil 3 when, viewed from an arrow direction of FIG. 2.

An explanation will be made with respect to the slot 19 formed in the stator iron core 2, and the stator coil 3 referring to the view from an arrow direction of FIG. 2.

FIG. 4 is a sectional view of the slot 19 formed in the stator iron core 2, and the stator coil 3 when viewed from the arrow direction of FIG. 2.

The stator coil 3 is composed of a top coil 3-1 and a bottom coil 3-2 having the axial end electrically connected each other at its axial outer side of stator iron core 2. A straight section of the stator coil 3 is embedded in the slot 19 formed in the inner diameter side of the stator iron core 2 in the order of the bottom coil 3-2, and the top coil 3-1. The inner diameter side of the slot 19 is then fixed by the wedge 26. The wedge 26 serves to fix the bottom coil 3-2 and the top coil 3-1 (stator coil 3) to the slot 19 formed in the stator iron core 2.

<Generally Employed Repair Method of Stator Iron Core 2>

A generally employed repair method of the stator iron core 2 will be described before explaining the repair method of the stator iron core 2 according to the example.

In the generally employed repair method of the stator iron core 2, if the damage to the stator iron core 2 is detected, the rotor 1 and the end bracket 9 are removed.

If the damage exists in a position near the surface (inner diameter side), the damage is repaired by directly grinding off the damaged part. Meanwhile, if the damage exists in a deep position from the surface (outer diameter side), it is impossible to repair the damage by directly grinding off the damaged part.

In this case, the damage is repaired by executing the following procedures. That is, the stator coil 3 is disassembled. The rotary electric machine casing 6 is turned by an angle of 90°, and rearranged to vertically direct its axial direction. Disassembly is performed from the upper side in the order of the copper shield 21, the core clamp 20, and the end duct piece 22 so that the stator iron core 2 is partially disassembled. The damaged stator iron core 2 (silicon steel sheet) is then replaced, or the insulation is added.

The damaged part that exists relatively near the end duct piece 22 may be repaired by disassembling the copper shield 21, the core clamp 20, and the end duct piece 22, and partially disassembling the stator iron core 2 without moving the rotary electric machine casing 6 to allow replacement of the damaged stator iron core 2 (silicon steel sheet), or addition of the insulation.

The generally employed repair method of the stator iron core 2 by replacing the silicon steel sheet or adding the insulation requires the large-scale work, for example, disassembly of the stator coil 3 and the stator iron core 2, leading to an increased repair cost and prolonged repair time.

The repair method of the stator iron core 2 according to the example allows repair of the damaged stator iron core 2 without disassembling the stator coil 3 or the stator iron core 2 even in the case of repairing the damaged part in the deep position from the surface of the stator iron core 2. The deep position from the surface of the stator iron core 2 is defined as the position where the damaged part cannot be directly scraped off for repairing, or the position at the outer diameter side to the surface (inner diameter side of the stator iron core 2.

<Repair Method of Stator Iron Core 2 According to the Example>

An explanation will be made with respect to the repair method of the stator iron core 2 referring to the lateral view of the axial end structure of the rotary electric machine 100 according to the example.

Figure 5:
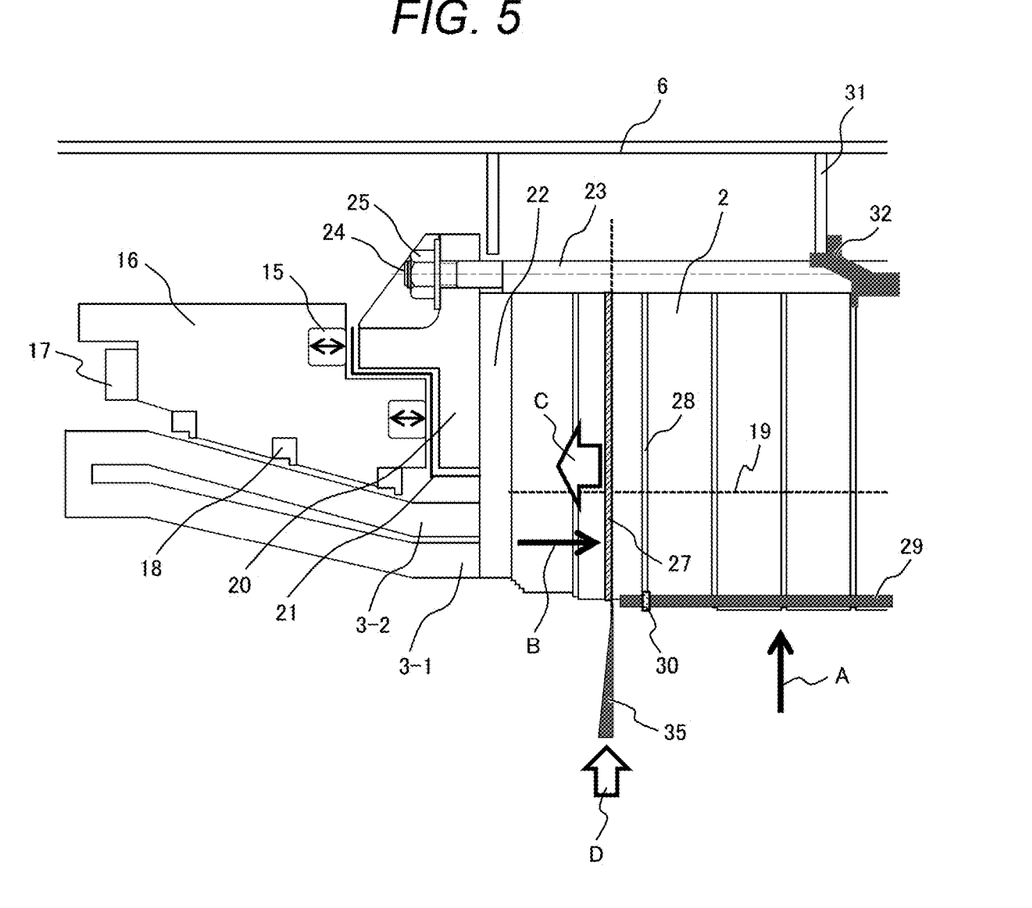
FIG. 5 is a sectional view of the axial end structure of the rotary electric machine 100 according to the example when viewed from a lateral direction, indicating the repair method of the stator iron core 2.

FIG. 5 is a sectional view of the axial end structure of the rotary electric machine 100 according to the example when viewed from the lateral direction, indicating the repair method of the stator iron cove 2.

The repair method of the stator iron core 2 according to the example allows repair of the damaged stator iron core 2 without moving the rotary electric machine casing 6 or disassembling the stator coil 3 and the stator iron core 2 even in the case of repairing the damage located in the deep position from the surface of the stator iron core 2.

Specifically, the damaged section 27 (insulation damage) of the stator iron core 2 as laminated silicon steel sheets is exposed to access the damaged part (insulation damage) of the silicon steel sheet. The insulation damage of the silicon steel sheet can be repaired by adding the insulation (applying the insulating plate or the insulating coating (insulating varnish)).

Upon detection of the damaged section 27 of the stator iron core 2, electric current is applied to the cable wound around the outer circumference of the stator iron core 2 to cause main magnetic flux inside the stator iron core 2. If the stator iron core 2 has the damaged section 27, the circulating current passing through the damaged section 27 is generated in the direction for cancelling the main magnetic flux. As a result, the damaged section 27 in the stator iron core 2 has its temperature locally increased so that the exact silicon steel sheet which suffers the insulation damage is detected.

There may be the cases of causing the following restrictions as a result of moving a part of the stator iron core 2 (partially moving the stator iron core 2) to expose the damaged section 27 thereof, in other words, forming a predetermined gap between the laminated silicon steel sheets of the stator iron core 2 having the damaged section 27.

(i) It is necessary to move the core clamp 20 in the axial direction of the stator iron core 2 for the purpose of moving a part of the stator iron core 2. The core clamp 20, however, is fixed via the copper shield 21 to the axial support 16 which is secured to the stator coil 3. The core clamp, thus, cannot be moved in the axial direction.

(ii) The stator iron core 2 is compressed by the core clamp 20 and the key bar 23 from both ends. Even if the stator iron core 2 can be partially moved by moving the core clamp 20, the compressed stator iron core 2 expands in the axial direction. Accordingly, in the case where each movement of the core clamp 20 and the stator iron core 2 is small (approximately several millimeters), the predetermined gap cannot be formed between the laminated silicon steel sheets.

Considering those restrictions, the damaged part of the silicon steel sheet, in other words, the damaged section 27 of the stator iron core 2 (damage to the stator iron core 2) is repaired in the following procedures (steps). The repair method of the stator iron core 2 according to the example is implemented by the following procedures.

(1) Remove the rotor 1 and the end bracket 9.
(2) Remove the wedge 26 to which the stator coil 3 is fixed from the slot 19 formed in the stator iron core 2.
(3) Place an iron core compression rod 29 as an iron rod member and an iron core compression tab 30 as an iron fixing member. The iron core compression tab 30 has a through hole through which the axially placed iron core compression rod 29 penetrates so that the iron core compression tab 30 is combined with the iron core compression rod 29, and fixed thereto. The iron core compression rod 29 and the iron core compression tab 30 are placed at several positions on the inner circumferential side of the stator iron core 2.

The iron core compression rod 29 and the iron core compression tab 30 are allowed to access the space caused by removing the rotor 1, and to be placed therein.

The iron core compression rod 29 has its outer surface threaded like a bolt. The iron core compression tab 30 has its inner surface threaded like a nut. The iron core compression tab 30 is moved by rotating the iron core compression rod 29. For example, the iron core compression tab 30 is moved inward (to the right in FIG. 5) by rotating the iron core compression rod 29 rightward (clockwise).

The iron core compression tab 30 has a projection to be fitted with (fixed to) the intermediate duct 23. The projection is formed on the outer surface of the iron core compression tab 30. The intermediate duct 28 is fitted with the projection of the iron core compression tab 30, and fixed.

The iron core compression tab 30 combined with the iron core compression rod 29 is fitted with (fixed to) the intermediate duct 23 adjacent to the damaged section 27 of the stator iron core 2. The intermediate duct 28 adjacent to the damaged section 27 of the stator iron core 2 is defined as the one which is the closest to the damaged section 27 of the stator iron core 2 at the side opposite the end duct piece 22 (right side in FIG. 5) to the damaged section 27.

Meanwhile, an iron core compression tab (not shown) like the iron core compression tab 30 is provided at the other end of the iron core compression rod 29 at the side opposite the one with which the iron core compression tab 30 is engaged. The iron core compression tab is moved by rotating the iron core compression rod 29. For example, the iron core compression tab is moved inward (to the left in FIG. 5) by rotating the iron core compression rod 29 rightward (clockwise). The thread of the iron core compression tab is oppositely directed to the direction of the thread of the iron core compression tab 30. The iron core compression tab combined with the iron core compression rod 29 is located at the position of the intermediate duct 28 farthest from the damaged section 27 of the stator iron core 2, or the position of the end duct piece 22 farthest from the damaged section 27 of the stator iron core 2.

In the example, the stator iron core 2 (part of the stator iron core 2) from the one at the side of the end duct piece 22 to the damaged section 27 of the stator iron core 2 is axially moved toward the end duct piece 22 (to the left in FIG. 5; see arrow direction C). The iron core compression tab 30 and the iron core compression tab, which are combined with the iron core compression rod 29, fix the other part of the stator iron core 2 at the side opposite the end duct piece 22 to the damaged section 27 of the stator iron core 2 (the part of the stator iron core 2 between the iron core compression tab 30 and the iron core compression tab, which does not have to be moved: the remaining part of the stator iron core 2 other than the one to be moved).

Before forming the gap between the laminated silicon steel sheets by partially moving the silicon steel sheets that constitute the stator iron core 2, the iron core compression rod 29, the iron core compression tab 30, and the iron core compression tab are placed for fixing the silicon steel sheets which are not required to foe partially moved in the axial direction to prevent axial movement of the silicon steel sheets.

The stator iron core 2 which is not required to be moved is clamped between the iron core compression tab 30 and the iron core compression tab, which are combined with the iron core compression rod 29 for fixation. Even in the case of releasing the compression state of the stator iron core 2 using the key bar 23, the key bar bolt 24, and the key bar nut 25, it is possible to suppress expansion of the stator iron core 2 clamped between the iron core compression tab 30 and the iron core compression tab, which are combined with the iron core compression rod 29. This makes it possible to avoid the foregoing restriction (ii).

(4) Place a rear stopper 32 between the stator main plate 31 placed on the outer circumferential side of the stator iron core 2 for supporting the rotary electric machine casing 6 while forming the predetermined space therein, and the intermediate duct 28 adjacent to the stator main plate 31.

The rear stopper 32 has one end provided with a projection in contact with a surface of the stator main plate 31 at a side that does not face the end duct piece 22, and the other end provided with a projection to be fitted with (fixed to) the intermediate duct 28. The rear stopper 32 has one end in contact with the surface of the stator main plate 31 at the side that does not face the end duct piece 22, and the other end fixed to the intermediate duct 28. The projection of the rear stopper 32 is fixed through fixation to the intermediate duct 23 to fix the rear stopper 32. The rear stopper 32 is placed between the stator main plate 31 and the adjacent intermediate duct 28 to axially fix the silicon steel sheets which are not required to be partially moved in the axial direction. The rear stoppers 32 are placed at several points on the outer circumferential side of the stator iron core 2.

The rear stopper 32 is placed through access to the predetermined inner space of the rotary electric machine casing 6 from a manhole formed in the rotary electric machine casing 6 for a periodic inspection.

The intermediate duct 28 adjacent to the stator main plate 31 is defined as the one located adjacent to the first stator main plate at the opposite side of the end duct piece 22 to the damaged section 27 of the stator iron core 2, which is farther than the adjacent stator main plate 31 from the end duct piece 22.

Even in the case of releasing the compressed state of the stator iron core 2 using the key bar 23, the key bar bolt 24, and the key bar nut 25, it is possible to suppress expansion of the stator iron core 2. This makes it possible to avoid the foregoing restriction (ii).

(5) Release the key bar nut 25 fastened to the key bar bolt 24, and remove the key bar nut 25.
(6) Disassemble the slide bearing 15 to allow axial movement of the core clamp 20 (for securing the axially movable range of the core clamp 20). This makes it possible to avoid the foregoing restriction (i).

In the example, the explanation has been made with respect to the repair method of the stator iron core 2 of the rotary electric machine 100 in which the axial support 16 has the slide bearing 15. In the case of the repair method of the stator iron core 2 of the rotary electric machine 100 in which the axial support 16 has no slide bearing 15, the explanation may be made with respect to another joining means (for example, bolt fastening) in place of the slide bearing 15 for joining the axial support 16 and the core clamp 20.

(7) Move the core clamp 20 axially (arrow direction C) to expose the damaged section 27 of the stator iron core 2 while holding the stator coil 3 at its original position (slot 19). Insert a sharply pointed jig 35 between the core clamp 20 and the end duct piece 22 so that the core clamp 20 is axially moved uniformly over the entire circumference. Pull out the jig 35 after forming the gap between the core clamp 20 and the end duct piece 22, and moving the core clamp 20.

(8) Move the end duct piece 22 axially (arrow direction C) while holding the stator coil 3 at the original position (slot 19). Insert the sharply pointed jig 35 between the end duct piece 22 and the stator iron core 2 so that the end duct piece 22 is axially moved uniformly over the entire circumference. Pull out the jig 35 after forming the gap between the end duct piece 22 and the stator iron core 2, and moving the end duct piece 22.

(9) Move a part of the stator iron core 2 (the part of the stator iron core 2 located at the side of the end duct piece 22 to the damaged section 27 of the stator iron core 2) axially (arrow direction C) while holding the stator coil 3 at the original position (slot 19) so that the damaged section 27 of the stator iron core 2 is exposed. Insert the sharply pointed jig 35 into the damaged section 27 of the stator iron core 2 in an arrow direction D (from the inner diameter side to the outer diameter side of the stator iron core 2) to axially move the part of the stator iron core 2 uniformly over the entire circumference. Form a predetermined gap from the damaged section 27 of the stator iron core 2.

In other words, the silicon steel sheets constituting the stator iron core 2 are partially moved in the axial direction while holding the stator coil 3 at the original position (slot 19). The gap is formed between the laminated silicon steel sheets in the existence of the damaged section 27 of the stator iron core 2.

The predetermined gap is formed from the damaged section 27 of the stator iron core 2. The jig 35 is pulled out after moving the part of the stator iron core 2.

In the case of moving the thick part of the stator iron core 2, such part may be dividedly moved multiple times.

Movement of the part of the stator iron core 2 while holding the stator coil 3 at the original position (slot 19) allows formation of the predetermined gap for the access to the damaged section 27 of the stator iron core 2. This may omit the large-scale construction work such as disassembly of the stator coil 3 and the stator iron core 2, resulting in the repair of the damaged section 27 of the stator iron core 2 at low cost in a short time.

Detect the damaged section 27 of the stator iron core 2 using the fiberscope, for example. The insulator is added (application of the insulating plate or insulating coating) to the damaged part of the detected silicon steel sheet for repairing the damaged section 27 (damaged part of the silicon steel sheet) of the stator iron core 2.

In other words, the insulator is added (application of the insulating plate or insulating coating) to the damaged part of the silicon steel sheet from the gap formed between the laminated silicon steel sheets so that the damaged part of the silicon steel sheet is repaired.

The damaged section 27 of the stator iron core 2 is detected as the position of the insulation damage which has occurred in the silicon steel sheet. In other words, such position (depth) from the surface of the stator iron core 2 is detected.

(11) After repairing the damaged section 27 of the stator iron core 2, place (assemble) the slide bearing 15. Fasten the key bar nut 25 to the key bar bolt 24. Then return the moved part of the stator iron core 2, the end duct piece 22, and the core clamp 20 to their original positions.

(12) Fasten the key bar bolt 24 and the key bar nut 25 by the specified torque to return the part of the stator iron core 2, the end duct piece 22, and the core clamp 20 to their original positions. Then remove the iron core compression rod 29, the iron core compression tab 30 and the iron core compression tab.

Even in the case of repairing the damaged part of the silicon steel sheet, which is located in the deep position from the surface of the stator iron core 2, the example allows repair of the damaged section 27 of the stator iron core 2 at low cost in a short time without requiring movement of the rotary electric machine casing 6 or disassembly of the stator coil 3 and the stator iron core 2.

The example allows repair of the damaged section 27 of the stator iron core 2 while holding the rotary electric machine 100 transversely placed (directed).

Figure 6:
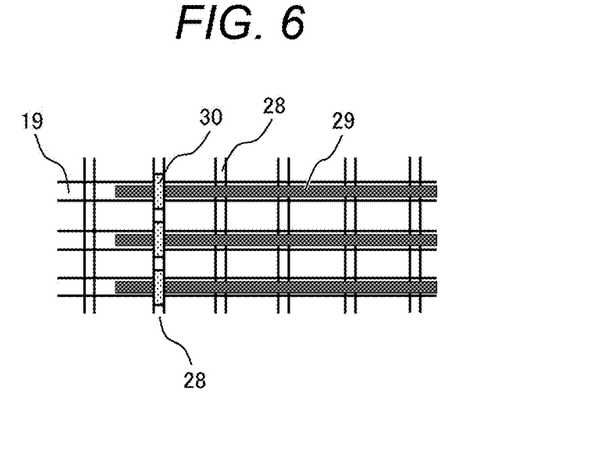
FIG. 6 is a plan view of an iron core compression rod 29 and an iron core compression tab 30 when viewed from an arrow direction A of FIG. 5.

An explanation will be made with respect to the iron core compression rod 29 and the iron core compression tab 30 referring to the view from an arrow direction A (inner diameter side of the stator iron core 2) of FIG. 5.

FIG. 6 is a plan view of the iron core compression rod 29 and the iron core compression tab 30 when viewed from the arrow direction A of FIG. 5

As FIG. 6 illustrates, the iron core compression rod placed over the slot 19 from which the wedge 26 has been removed. The iron core compression tab 30 engaged with the iron core compression rod 29 is fitted with the intermediate duct 28. The iron core compression rods 29 and the iron core compression tabs 30 are disposed at several points on the inner circumferential side of the stator iron core 2.

Figure 7:
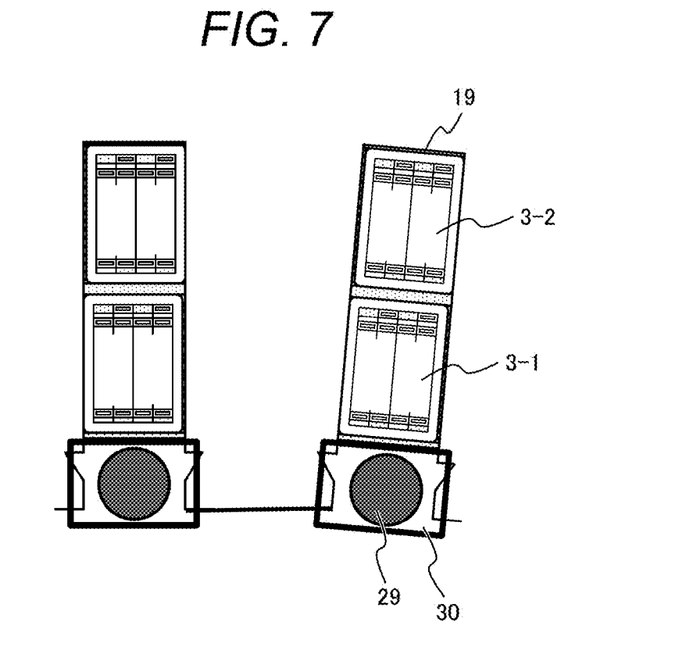
FIG. 7 is a sectional view of the slot 19 formed in the stator iron core 2, the stator coil 3, the iron core compression rod 29, and the iron core compression tab 30 when viewed from an arrow direction B of FIG. 5.

An explanation will be made with respect to the slot 19 formed in the stator iron core 2, the stator coil 3, the iron core compression rod 29, and the iron core compression tab 30 referring to the view from an arrow direction B (axial direction) of FIG. 5.

FIG. 7 is a sectional view of the slot 19 formed in the stator iron core 2, the stator coil 3, the iron core compression rod 29, and the iron core compression tab 30 when seen from the arrow direction B of FIG. 5.

As FIG. 7 illustrates, the iron core compression rod 29 and the iron core compression tab 30 are placed over the slot 19 from which the wedge 26 has been removed while having the top coil 3-1 and the bottom coil 3-2 kept at the original positions.

Figure 8:
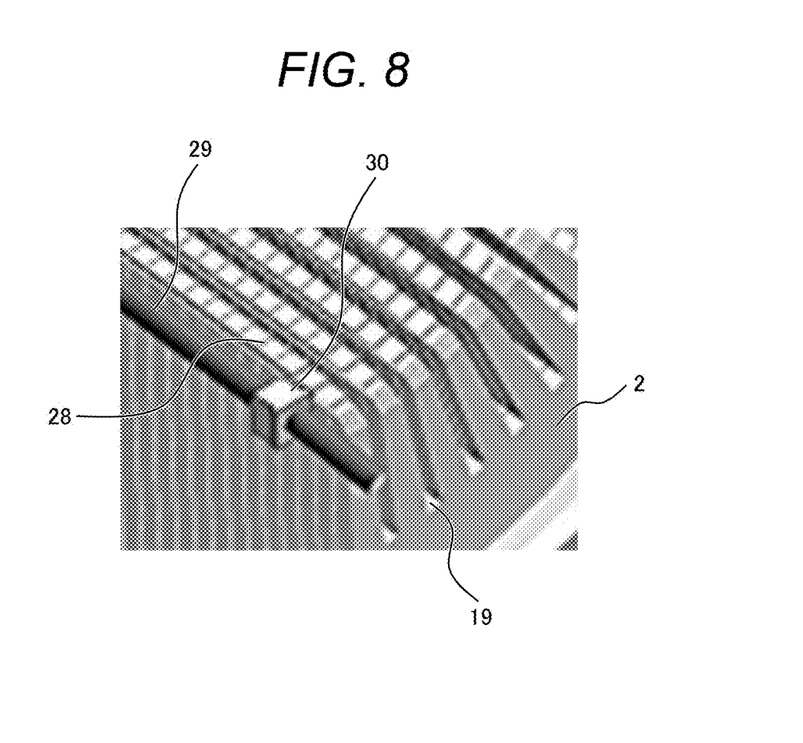
FIG. 8 is a perspective view of the iron core compression rod 29 and the iron core compression tab 30 according to the example when viewed from a diagonal direction.

An explanation will foe made with respect to the iron core compression rod 29 and the iron core compression tab 30 according to the example referring to the diagonal view.

FIG. 8 is a perspective view of the iron core compression rod 29 and the iron core compression tab 30 according to the example when viewed from the diagonal direction.

As FIG. 8 illustrates, the iron core compression rod 29 is placed over the slot 19 from which the wedge 26 has been removed. The intermediate duct 28 is placed to be fitted with (fixed to) the projection of the iron core compression tab 30 engaged with the iron core compression rod 29. FIG. 8 omits illustration of the stator coil 3.

The repair method of the stator iron core 2 according to the example implements the repair of the stator iron core 2 which includes the slot 19 for accommodating the stator coil 3, and is formed by laminating the silicon steel sheets. The method includes the steps of moving a part of the silicon steel sheets which form the stator iron core 2 while holding the stator coil 3 in the slot 19 to form the gap between the laminated silicon steel sheets of the stator iron core 2 in the existence of the damaged section 27, and adding the insulation (applying the insulating plate or the insulating coating) to the damaged part 33 of the silicon steel sheet from the gap formed between the laminated silicon steel sheets to repair the damaged part 33 of the silicon steel sheet.

The method of the example allows repair of the damaged section 27 of the stator iron core 2 at low cost in a short time even in the case of repairing a damaged part 33 of the silicon steel sheet, which is located in the deep position from the surface of the stator iron core 2.

Figure 9:
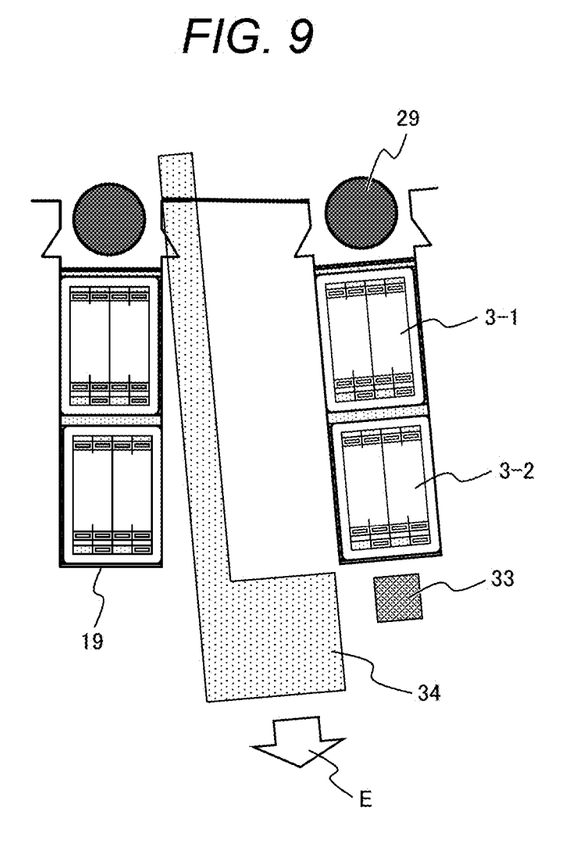
FIG. 9 is a sectional view from the arrow direction B of FIG. 5, indicating the repair method (step 1) of the stator iron core 2 according to the example.
Figure 10:
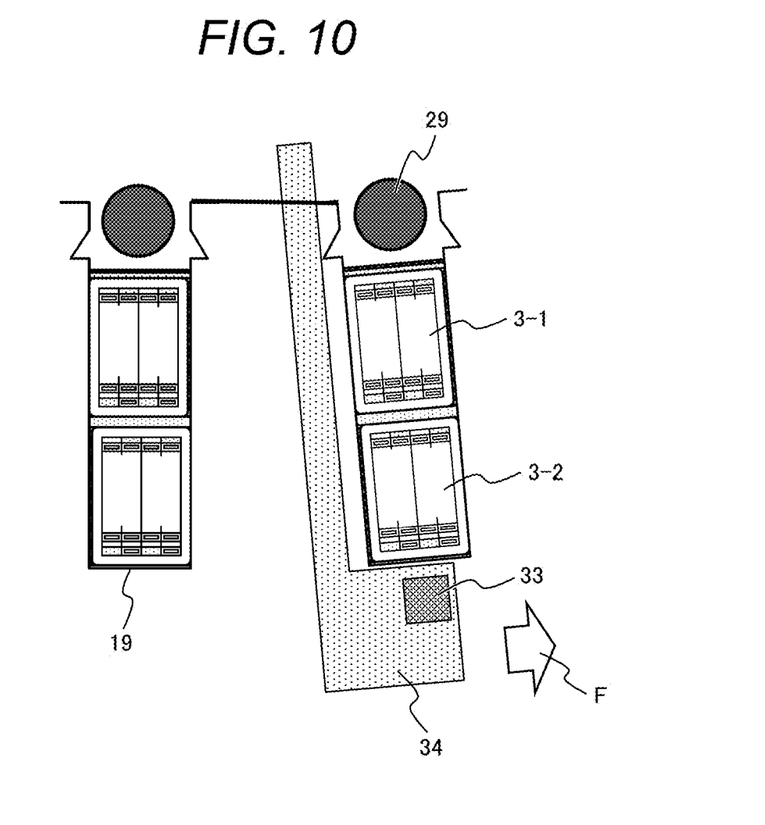
FIG. 10 is a sectional view from the arrow direction B of FIG. 5, indicating the repair method (step 2) of the stator iron core 2 according to the example.

An explanation will be made with respect to the repair method of the stator iron core 2 according to the example (an exemplary case) referring to the view from the arrow direction B of FIG. 5.

FIG. 9 is a sectional view from the arrow direction B of FIG. 5, indicating the repair method (step 1) of the stator iron core 2 according to the example.

FIG. 10 is a sectional view from the arrow direction B of FIG. 5, indicating the repair method (step 2) of the stator iron core 2 according to the example.

FIG. 9 and FIG. 10 illustrate that the damaged part (short circuit part) 33 of the silicon steel sheet in the damaged section 27 of the stator iron core 2 is located in the deep position (outer diameter side) from the surface of the stator iron core 2 (inner diameter side), more specifically, the damaged part is located at the rear-surface side (backside) of the stator coil 3 (outer diameter side of the bottom of the slot 19). FIG. 9 and FIG. 10 are vertically inverted views of FIG. 4 and FIG. 7.

As FIG. 9 illustrates, an L-like insulating plate 34 made of mica or the like is inserted in a radial direction (arrow direction E). After passage of a tip (lateral linear part of the L-like plate) of the insulating plate 34 by the bottom of the slot 19, the insulating plate 34 is moved in a circumferential direction (arrow direction F) as illustrated in FIG. 10 so that the tip of the insulating plate 34 reaches the damaged part 33 of the silicon steel sheet. The damaged part 33 of the silicon steel sheet can be repaired by leaving (applying) the insulating plate 34.

This is achieved by forming the predetermined gap between the laminated silicon steel sheets for allowing access to the damaged section 27 of the stator iron core 2 without disassembling the stator coil 3. The damaged part 33 of the silicon steel sheet can be repaired even if the damaged part 33 of the silicon steel sheet is located at the rear-surface side of the stator coil 3 which interferes with the access to the damaged part 33.

Figure 11:
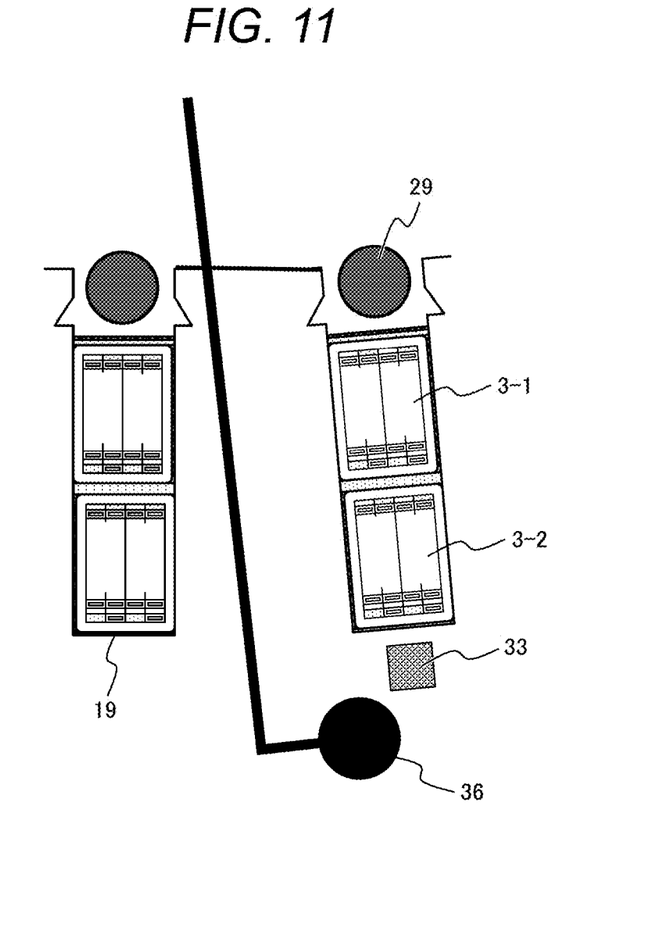
FIG. 11 is a sectional view from the arrow direction 3 of FIG. 5, indicating (another) repair method of the stator iron core 2 according to the example.

An explanation will be made with respect to the repair method of the stater iron core 2 according to the example (another exemplary case) referring to the view from the arrow direction B of FIG. 5.

FIG. 11 is a sectional view from the arrow direction B of FIG. 5, indicating the repair method (another exemplary case) of the stator iron core 2 according to the example.

FIG. 11 illustrates that the damaged part 33 of the silicon steel sheet in the damaged section 27 of the stator iron core 2 is located in the deep position from the surface of the stator iron core 2, more specifically, the damaged part is located at the rear-surface side of the stator coil 3. FIG. 11 is a vertically inverted view of FIG. 4 and FIG. 7.

As FIG. 11 illustrates, an L-like brush 36 (jig having a brush at its tip of the lateral linear part of the L-like structure) for applying the insulating coating to the damaged part 33 of the silicon steel sheet is inserted in the radial direction. After passage of the brush 36 by the bottom of the slot 19, the brush 36 is moved in the circumferential direction to reach the damaged part 33 of the silicon steel sheet. The damaged part 33 of the silicon steel sheet can be repaired through application of the insulating coating using the brush 36.

This is achieved by forming the predetermined gap between the laminated silicon steel sheets for allowing access to the damaged section 27 of the stator iron core 2 without disassembling the stator coil 3. The damaged part 33 of the silicon steel sheet can be repaired even if the damaged part 33 of the silicon steel sheet is located at the rear-surface side of the stator coil 3 which interferes with the access to the damaged part 33.

Figure 12:
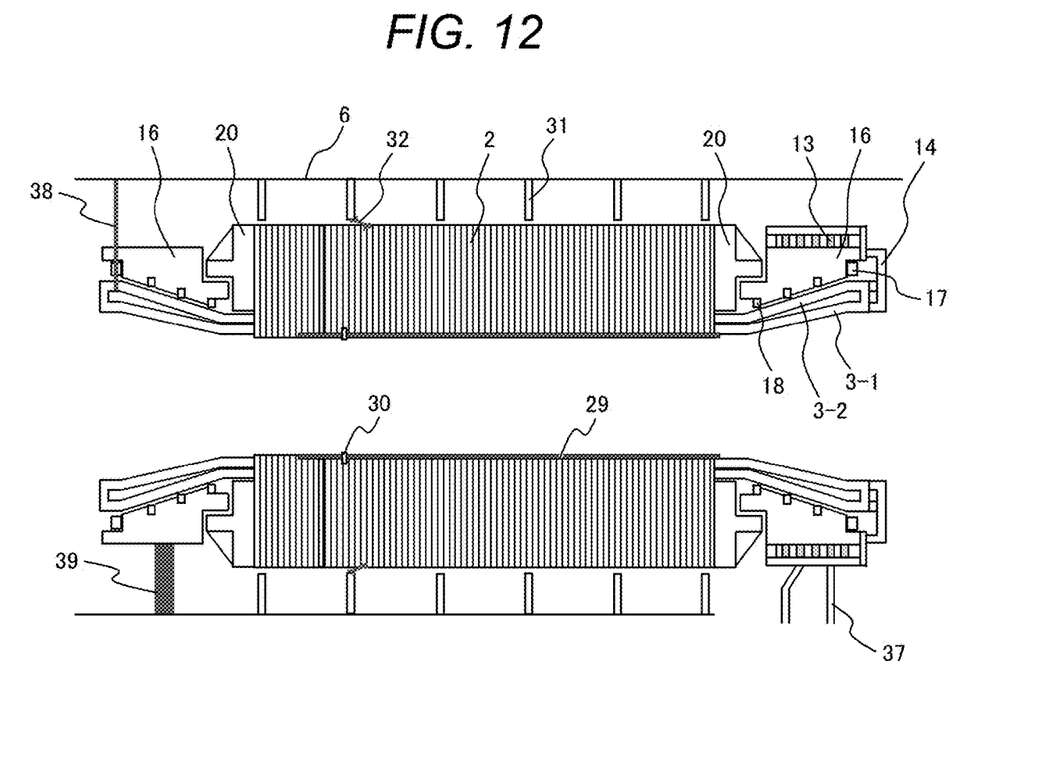
FIG. 12 is a sectional view of a laterally seen structure of the rotary electric machine 100 according to the example, illustrating a chain block 38 and a hydraulic jack 39 for supporting the axial end of the stator coil 3.

An explanation will be made with respect to a chain block 33 and a hydraulic jack 39 for supporting the axial end of the stator coil 3 referring to the lateral view of the structure of the rotary electric machine 100 according to the example.

FIG. 12 is a sectional view of a laterally seen structure of the rotary electric machine 100 according to the example, representing the chain block 38 and the hydraulic jack 39 for supporting the axial end of the stator coil 3.

As FIG. 12 illustrates, in this example, the coil end part as the axial end of the stator coil 3 is lifted upward by the chain block 38 from the rotary electric machine casing 6 while monitoring vertical and horizontal movements of the coil end part so that the coil end part is not deflected by its self-weight monitoring a dial gauge. The axial support 16 as the coil end part is pushed up by the hydraulic jack 39 from below for keeping the position of the coil end part, and preventing application of excessive external force to the coil end part.

When using the chain block 38 and the hydraulic jack 39 for repairing the damaged part 33 of the silicon steel sheet, the rotor 1 and the end bracket 9 are removed. Before removing the slide bearing 15, the chain block 38 and the hydraulic jack 39 are used to hang the coil end part, and push up the axial support 16.

After the stator iron core 2 is repaired, the iron core compression rod 29 and the iron core compression tab 30 are removed. The chain block 38 and the hydraulic jack 35 are then removed.

The present invention which is not limited to the aforementioned examples includes various kinds of modifications. For example, the aforementioned examples have been described in detail for easy understanding of the present invention. Therefore, it is not necessarily limited to be configured to have all the components as described above.

It is possible to partially replace a structure of one of the examples with a structure of another example, or partially add the structure of one of the examples to the structure of another example. It is also possible to eliminate, add, and replace a part of the structure of one of the examples from, to, and with a part of the structure of another example.

REFERENCE SIGNS LIST

1 . . . rotor, 2 . . . stator iron core, 3 . . . stator coil, 3-1 . . . top coil, 3-2 . . . bottom coil, 4 . . . stator, 5 . . . high-pressure bushing, 6 . . . rotary electric machine casing, 7 . . . terminal box, 8 . . . hydrogen cooler, 9 . . . end bracket, 10 . . . brush gear, 11 . . . foot, 12 . . . current transformer, 13 . . . crossover, 14 . . . lead wire, 15 . . . slide bearing, 16 . . . axial support, 17 . . . permanent ring, 18 . . . support ring, 19 . . . slot, 20 . . . core clamp, 21 . . . copper shield, 22 . . . end duct piece, 23 . . . key bar, 24 . . . key bar bolt, 25 . . . key bar nut, 26 . . . wedge, 27 . . . damaged section of stator iron core 2, 28 . . . intermediate: duct, 29 . . . iron core compression rod, 30 . . . iron core compression tab, 31 . . . stator main plate, 32 . . . rear stopper, 33 . . . damaged part of silicon steel sheet, 34 . . . insulating plate, 35 . . . sharply pointed jig, 36 . . . brush, 37 . . . lead wire, 38 . . . chain block, 39 . . . hydraulic jack, 100 . . . rotary electric machine

What is claimed is:

1. A repair method of a stator iron core which has a slot for accommodating a stator coil, the stator iron core being formed by laminating silicon steel sheets and the stator iron core having a damaged part that cannot be directly scraped for repair from a surface of the stator iron core, the method comprising the steps of:
   moving a part of the silicon steel sheets which form the stator iron core while holding the stator coil in the slot to form a gap, in the location of the damaged part, between the laminated silicon steel sheets of the stator iron core; and
   adding an insulation to the damaged part of the silicon steel sheet from the gap formed between the laminated silicon steel sheets to repair the damaged part of the silicon steel sheet.

2. The repair method of the stator iron core according to claim 1, wherein the insulator is added by applying an insulating plate or an insulating coating.

3. The repair method of the stator iron core according to claim 2, wherein an L-like insulating plate is applied as the insulating plate, or an L-like brush is used for applying the insulating coating.

4. The repair method of the stator iron core according to claim 1,
   wherein the part of the silicon steel sheets is moved; and
   before forming the gap between the laminated silicon steel sheets, an iron core compression rod as a rod-like member and an iron core compression tab as a fixing member to be fixed to the iron core compression rod are placed to axially fix the silicon steel sheets which are made partially immovable.

5. The repair method of the stator iron core according to claim 4, wherein the iron core compression tab is fitted with an intermediate duct adjacent to the damaged part of the stator iron core.

6. The repair method of the stator iron core according to claim 5, wherein a rear stopper is placed between a stator main plate located on an outer circumferential side of the stator iron core and the intermediate duct adjacent to the stator main plate for axially fixing the silicon steel sheets which are made partially immovable.

7. The repair method of the stator iron core according to claim 1, wherein a coil end part as an axial end of the stator coil is preliminarily hung by a chain block, and the coil end part is preliminarily pushed up by a hydraulic jack.

8. The repair method of the stator iron core according to claim 1, wherein a rear stopper is placed between a stator main plate located on an outer circumferential side of the stator iron core and an intermediate duct adjacent to the stator main plate to axially fix the silicon steel sheets which are made partially immovable.

* * * * *